Figure 1:
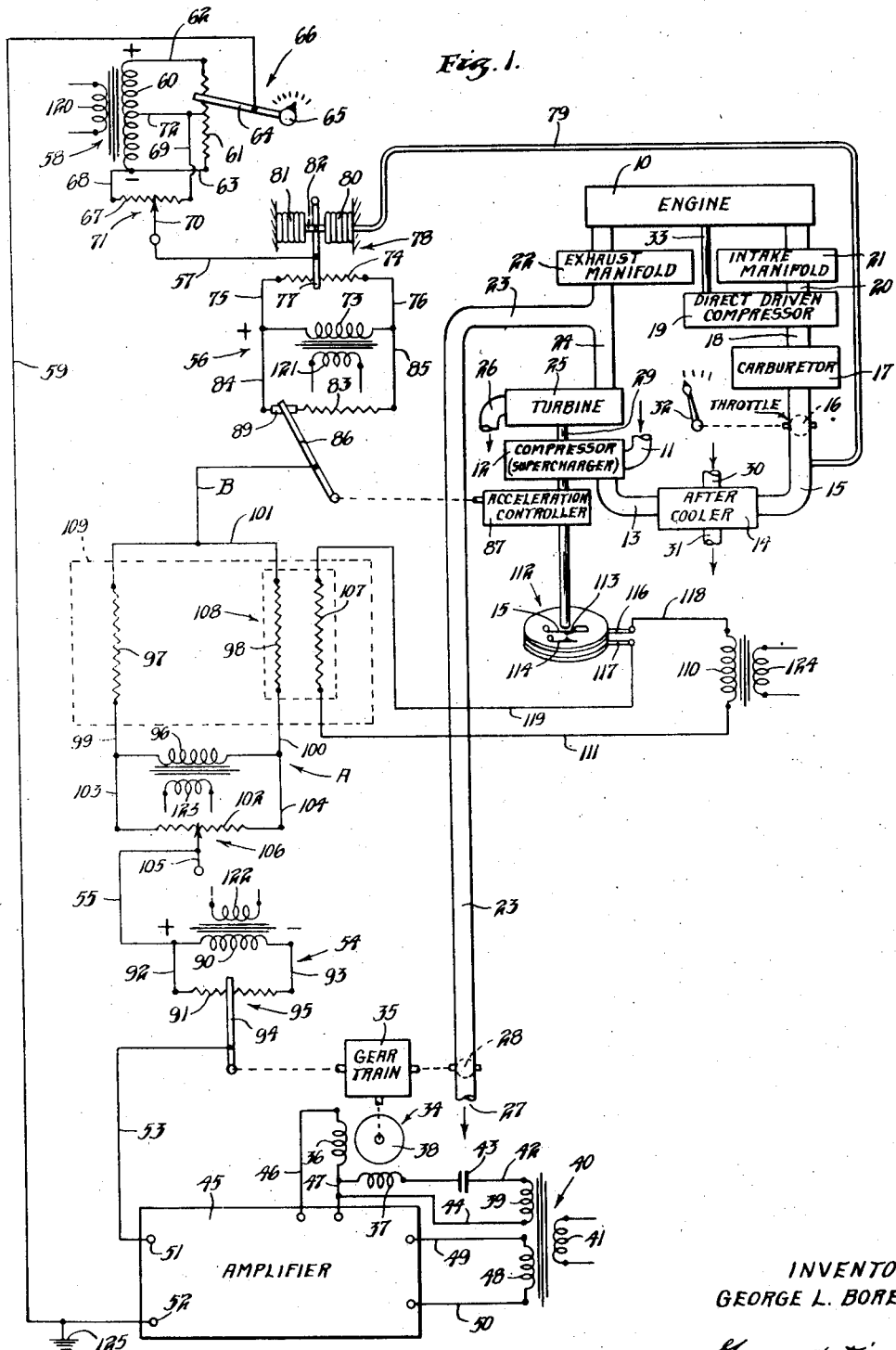

Dec. 21, 1948.  G. L. BORELL  2,456,765
HOT WIRE BRIDGE OVERSPEED CONTROLLER
Filed April 18, 1945  2 Sheets-Sheet 1

INVENTOR
GEORGE L. BORELL
BY George H. Fisher
ATTORNEY

Dec. 21, 1948.                G. L. BORELL                2,456,765
HOT WIRE BRIDGE OVERSPEED CONTROLLER
Filed April 18, 1945                                    2 Sheets-Sheet 2
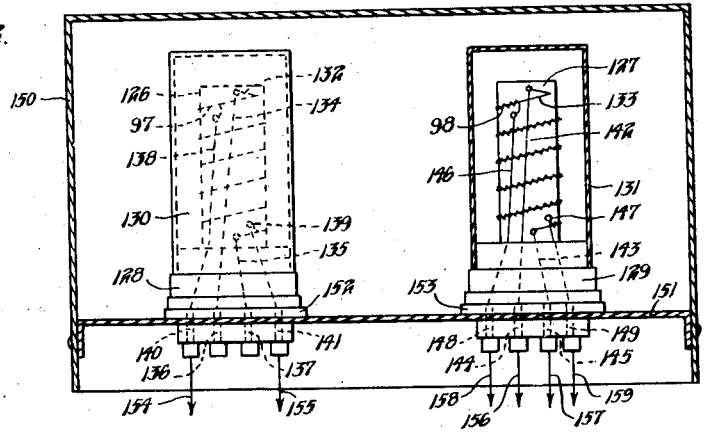
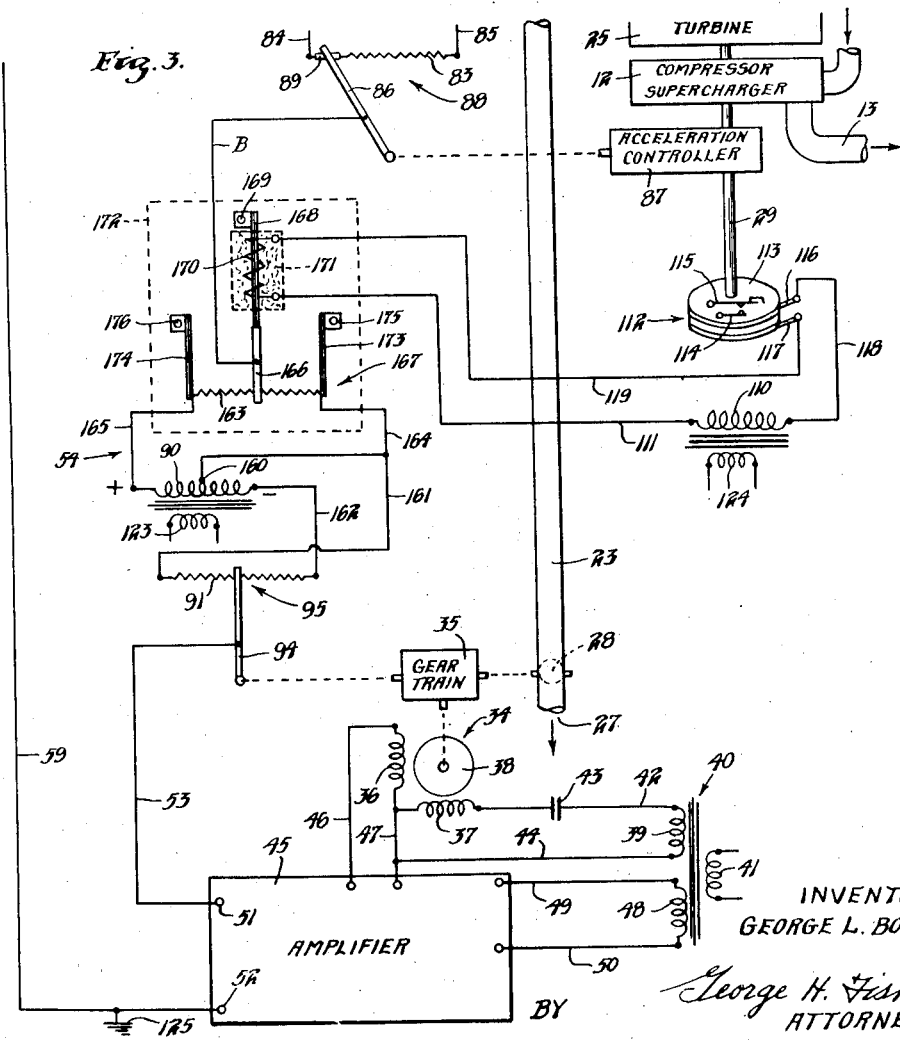
INVENTOR
GEORGE L. BORELL
BY George H. Fisher
ATTORNEY Patented Dec. 21, 1948

2,456,765

UNITED STATES PATENT OFFICE 2,456,765

HOT-WIRE BRIDGE OVERSPEED CONTROLLER

George L. Borell, Minneapolis, Minn., assignor to Minneapolis-Honeywell Regulator Company, Minneapolis, Minn., a corporation of Delaware Application April 18, 1945, Serial No. 589,078

13 Claims. (Cl. 230—11)

This invention relates generally to improvements in control systems for the turbine operated supercharging compressors used in connection with internal combustion engines, such as those used in aircraft, and more particularly to means for controlling the speed of the turbine-compressor unit, commonly called the turbo-supercharger.

In such installations, the turbine, which is driven by exhaust gases from the engine, operates at times at very high speed, in order that it may run the supercharging compressor at a velocity sufficient to provide adequate air for combustion in the engine. As an example, at the higher altitudes where the atmosphere pressure is low, the supercharger must provide very great compression in order to supply air at sufficient pressure for full power in the engine. The safe operating speed of the turbo-supercharger is, of course, limited for mechanical reasons and any increase above a safe maximum value may cause failure of the parts.

The speed of the turbo-supercharger, and the rate of compression of the air supplied to the engine, is controlled in such systems by a valve member, conveniently termed the waste gate, the position of which controls the flow of exhaust gases to the turbine. To position this waste gate, in accordance with demand, an electronic amplifier is used and the signal potential applied thereto is regulated by a compound electrical network having several variable factors, responsive to various conditions affecting proper operation of the turbo-supercharger and functioning mainly to select a waste gate position such as to maintain a desired turbo discharge pressure.

The primary object of my invention is to provide an almost completely electrical means for limiting the velocity of the turbo-supercharger and which will operate quickly, positively and with little likelihood of becoming inoperative, to quickly counteract any tendency toward overspeeding.

Another object is to provide electrical means, responsive to the speed of the turbine, for introducing a signal component in the amplifier such as to cause the same to adjust the waste gate to hold the turbine speed at or below the safe maximum value regardless of the call of other parts of the control system for increased speed.

Another object is to provide a combination thermally and electrically responsive control means operative when the turbine speed reaches a predetermined value, to immediately introduce a correction signal to the amplifier such as to effect the reduction in such speed, but to respond more slowly to the reduction in speed so that the correction signal will not be removed so quickly as to cause immediate restoration of the speed to the same value, such as would cause a hunting action in the control system.

These and other more detailed and specific objects will be disclosed in the course of the following specification, reference being had to the accompanying drawings, in which Figure 1 is a diagrammatical view of a complete engine induction and exhaust system, embodying a turbo-supercharger and an electrical control system therefor, and showing one modification of my overspeed control;

Figure 2 is a sectional view, partially in elevation, of one suitable arrangement and layout of the thermally responsive resistance elements of the bridge or network shown in Figure 1, and Figure 3 is a fragmentary diagrammatical view similar to Figure 1, but showing a modification of my overspeed limiting network, and showing only pertinent parts of the control system and engine assembly.

FIGURE 1

Referring now more particularly to Figure 1, I show therein an engine 10 which may be the engine of an aircraft. Air for supporting combustion in the engine passes from an intake 11 through a compressor 12, a conduit 13, an aftercooler 14, a conduit 15, a throttle 16, a carburetor 17, a conduit 18, a direct driven compressor 19, a conduit 20, and an intake manifold 21 into the engine.

The exhaust gases from the engine issue from an exhaust manifold 22 and are discharged through a duct 23 having a branch 24 leading to a turbine 25. The turbine is provided with an outlet 26 through which the exhaust gases may escape to atmosphere after passing through the turbine. The conduit 23, commonly termed the exhaust stack, also has an outlet 27 to atmosphere, and controlling the flow of exhaust gases from this outlet is a damper or valve 28 known as the waste gate.

The compressor 12 is driven from the turbine 25 through a shaft 29 and the air compressed in this compressor 12 passes through the aftercooler 14, wherein the heat of compression is at least partly removed by passing fresh air from an intake 30 in heat exchanging relation with the compressor discharge air, after which the cooling air is delivered at the outlet 31.

The thottle 16 may be adjusted by the hand control 32, and in the carburetor 17 fuel from a supply (not here shown) is mixed with the air to form a combustible gas.

The compressor 19 is directly driven from the engine by shaft 33 and is utilized not only as a compressor, but also to evenly distribute the mixture of fuel and air to all cylinders of the engine.

The waste gate 28 is driven by a motor 34 through a gear train 35. The motor 34 is of the split phase type, being provided with a pair of field windings 36 and 37 which are spaced 90 electrical degrees apart, and an armature 38. The field winding 37 is supplied with electrical energy from a secondary winding 39 of a transformer 40 having a primary winding 41 which is connected to a suitable source (not shown) of alternating current. The energizing circuit for the winding 37 may be traced from the upper terminal of the transformer winding 39 through a conductor 42, a condenser 43, the field winding 37, and a conductor 44 to the lower terminal of the secondary winding 39.

The flow of electrical energy to the motor field winding 36 is controlled by an electronic amplifier 45 to which the winding is connected by conductors 46 and 47. The amplifier 45 is powered from another secondary winding 48 on the transformer 40, to which the amplifier is connected through conductors 49 and 50.

The amplifier 45 is provided with a pair of input terminals 51 and 52 and operates to supply the field winding 36 of the motor with alternating current, the phase of which depends upon the phase of an alternating current signal impressed across these input terminals 51 and 52. Any suitable form of amplifier in which there is a constant phase relation between the input and output voltages may be used. Such amplifier is one of the type shown in Figure 1 of the copending application of Albert P. Upton, Serial No. 437,561, filed April 3, 1942, now matured into Patent No. 2,423,534 of July 8, 1947.

It will be evident that if the motor field winding 36 is supplied with alternating current which leads the current in the other field winding 37 by ninety electrical degrees the motor will rotate in one direction, whereas if the current in winding 36 lags the current in winding 37 by this amount, the motor will rotate in the opposite direction. The condenser 43 is provided for shifting the phase of the current to field winding 37 ninety degrees with respect to what it otherwise would be so that the current supplied to winding 36 by amplifier 45 either leads or lags that supplied to winding 37 by ninety degrees.

The phase of the signal applied to the amplifier input terminals 51 and 52 is determined by the electrical conditions existing in a compound network which consists of four main separate networks connected in series. The circuit between the amplifier input terminals may be traced from terminal 51 through a conductor 53, a first electrical network 54, a conductor 55, a second electrical network A forming the primary portion of the subject matter of the present invention, a conductor B, a third electrical network 56, a conductor 57, a fourth electrical network 58, and a conductor 59, back to the input terminal 52.

The network 58 includes a transformer secondary winding 60 across the terminals of which is connected a slidewire resistance 61 by means of conductors 62 and 63. The conductor 59 is connected to a slider 64 which cooperates with the resistance 61 and which is adjustable thereacross by means of a control knob 65. The resistance 61 and slider 64 together form a control point adjuster 66 or manual selector for the turbine discharge pressure control system.

Another slidewire resistance 67 is connected across one half of the transformer secondary winding 60 by a conductor 68, connected to a lower terminal thereof, and conductors 69 and 70 connected to a center tap on the winding. A slider 70 cooperates with the resistance 67 to form a calibrating potentiometer designated generally at 71. The center tap of the winding 60 is connected by conductor 72 to the center of the resistance 61 to decrease the impedance between the sliders 64 and 70.

The network 56 comprises a transformer secondary winding 73 across the terminals of which is connected a slidewire resistance 74 by means of conductors 75 and 76. Cooperating with this resistance 74 is a slider 77 and the conductor 57 connects sliders 70 and 77. The slider 77 and the resistance 74 together form a main pressure controller designated generally at 78, and this controller is adjusted in accordance with the pressure in the induction system of the engine. For this purpose a pressure takeoff duct 79 is connected to any suitable point between the supercharging compressor 12 and the engine, and it is here shown as connected to the duct 15 leading to the throttle 16. The duct 79 conveys the air pressure to the interior of a bellows 80. A second bellows 81 is provided and the two bellows 80 and 81 are supported with their free ends extending toward each other at opposite sides of the slider 77. These free ends are connected by link 82 to each other and to the slider 77 so that expansion and contraction of the bellows 80 in response to fluctuations in air pressure therein will shift the slider along the resistance 74. The bellows 81 is evacuated and compensates this controller for variations in atmospheric pressure in a well known manner.

A second slidewire resistance 83 is also connected across the winding 73 by means of conductors 84 and 85, and cooperating with resistance 83 is a slider 86 which is positioned in accordance with variations in the rate of acceleration of the turbine 25. For this purpose there is schematically shown a control device 87 connected to the operating shaft of the turbine, and the resistance 83 and slider 86 together form an acceleration compensating controller 88. It may here be noted that the slider 86 will normally remain in the position shown upon a dead spot 89 at the left hand end of resistance 83, but will swing to the right upon the acceleration of the turbine beyond a safe value. The dead spot 89 is provided so that minor accelerations of the turbine will have no effect upon the system.

The network 54 includes a transformer secondary winding 90 across whose terminals slidewire resistance 91 is connected by conductors 92 and 93. Cooperating with the resistance is a slider 94 which is moved along the resistance by a connection, as indicated, to the aforesaid gear train 35, the slider movement being thus concurrent with that of the waste gate 28. The resistance 91 and slider 94 together form a follow-up potentiometer 95 and the conductor 53 is connected to the slider.

As thus far described the system is substantially conventional in form, being quite similar to that disclosed in Figure 5 of the copending application of Hubert T. Sparrow, Serial No. 476,797 filed February 22, 1943. However, in such system there is embodied in the network 54 another resistance and slider (neither here shown), the latter being positioned by a mechanical controller operated off the turbine shaft 29 to affect balance conditions in this network upon the occurrence of an overspeed condition.

In accordance with the present invention, the network A is substituted for the mechanically positioned overspeed responsive controller of the previous system, this network being connected as indicated in series with the networks 54 and 56.

In the embodiment here illustrated, the network A comprises a transformer secondary winding 96 across whose terminals are connected the opposite ends of two series connected resistances 97 and 98, by means of conductors 99 and 100. The other ends of said resistances 97 and 98 are connected by a conductor 101 to which the conductor B leading to the network 56 is connected. Also connected across the terminals of the secondary winding 96 is a slidewire resistance 102, by conductors 103 and 104, and cooperating with this resistance is a slider 105 to which conductor 55 is connected. The resistances 97, 98, and 102 form a Wheatstone bridge energized by the secondary winding 96 and the resistance 102 and slider 105 cooperate to form a balancing potentiometer 106 which may be adjusted to balance the bridge.

The resistances 97 and 98 are of the type having a high temperature coefficient of resistance and have the property of increasing in effective resistance upon their being heated. The resistance 98 is arranged adjacent to an electrical heating element 107 and together therewith is enclosed in a heat insulating enclosure indicated diagrammatically at 108. This assembly of the resistance 98, heating element 107 and heat insulating enclosure 108, along with the resistance 97 forming the opposite leg at this side of the bridge, are enclosed within a heat dissipating enclosure or shield indicated diagrammatically at 109, so that resistance 97 is subject to ambient temperatures about the member 108.

The heating element 107 is energized by a transformer secondary winding 110 to one terminal of which one end of the element is connected by a conductor 111. While an alternating current source such as transformer 124—110 is shown as energizing the heating element 107, it is to be understood that a direct current source may be employed if desired. A centrifugally operated speed responsive switch 112 controls the energization of the heating element 107 and as here shown comprises a disk 113 connected to rotate with the turbine shaft 29 and carrying a fixed contact 114 and a movable contact 115. Connection is made to the contacts 114 and 115 by means of slip ring contacts or brushes 116 and 117, one of which is connected to the other terminal of the winding 110 by a conductor 118, and the other of which is connected to the other terminal of the heating element 107 by a conductor 119. The arrangement is such that the contacts 114 and 115 will close, under the influence of centrifugal force, when the speed of the turbine 25 reaches a predetermined safe maximum. The circuit will then be completed causing the secondary winding 110 to energize and heat the element 107, the heat from which immediately affects the thermally sensitive resistance 98 causing it to increase in effective resistance.

It may here be noted that all of the hereinbefore described secondary windings 60, 73, 80, 96, and 110 may be arranged on a common transformer, which may be the transformer 40, but they are here shown for convenience as separate transformers, having separate pimary windings represented at 120, 121, 122, 123 and 124 respectively. In any event, the various primaries will be connected to a common source of alternating current potential so that the alternating potentials at the respective secondary terminals will at all times be in phase with each other. The signal potential impressed across the input terminals 51 and 52 of the amplifier 45 will thus be the algebraic sum of a number of potentials developed in the respective networks 54, A, 56, and 58.

Operation of Figure 1

For convenience in this description, the potential conditions existing during a half cycle at which the various transformer secondary windings have the polarities indicated by the legends in the drawing will only be considered. For a reference potential, the conductor 59 is indicated as grounded at 125, so that the amplifier input terminal 52 is at zero potential to ground.

At the outset, the network A will also be assumed to be in balance so that it introduces no signal potential into the circuit between the networks 54 and 56, and conductors 55 and B are considered as of the same potential.

Considering then the network 58, the slider 64 in the position shown is slightly positive with respect to the center tap on the secondary winding 60, while the slider 70 being at a midpoint along the resistance 67 is at a substantial negative potential with respect to said center tap. This network is thus seen to introduce a potential into the series circuit connecting the amplifier input terminals of such polarity that the slider 70 and conductor 57 are negative with respect to the grounded conductor 59.

Turning now to the network 56, it will be evident that with the sliders 77 and 86 in the position shown, this network introduces into the aforesaid series circuit a voltage equal to the potential of the slider 77 with respect to the left hand terminal of the secondary winding 73. This potential is obviously such that the slider 86 is positive with respect to slider 77 and the potential appearing at the slider 86 with respect to ground depends upon the relative magnitude of the respectively negative and positive potentials introduced by the networks 58 and 56. For convenience, it may be assumed that the magnitude of the unbalance voltage of network 78 is greater than that of network 58 so that the slider 86 is at a positive potential with respect to grounded conductor 59.

At this point, it is considered that the slider 86 and conductor 55 are at the same relative potential and the network A is ignored as stated for the time being.

Considering finally the network 54, it will be evident that with the slider 94 at the midpoint indicated upon the resistance 91, it is at a negative potential with respect to conductor 55 so that this network introduces a signal voltage into the series circuit which opposes that between slider 86 and ground. For convenience, it may be assumed that the voltage introduced by network 54 exactly opposes the voltage between slider 86 and ground.

Under these assumed conditions then, the amplifier input terminal 51 is at the same ground potential as is the other input terminal 52 and no signal is impressed across the input of the amplifier. Under such conditions, the amplifier, of course, supplies no current to waste gate motor 34 and the waste gate remains at rest in the position called for by adjustment of the pressure selector 66 and other variable factors in the series circuit. However, should any one of the sliders in the various networks be moved from the positions here shown, it will be apparent that there will immediately occur a signal potential or difference in potential between the amplifier input terminals 51 and 52, due to the unbalance thus set up in the series circuit. The amplifier will immediately respond to this signal potential to supply the motor 34 with an energizing current in the field winding 36 such as to cause the motor 34 to move the waste gate 28 in a direction depending upon the polarity of said signal potential, until displacement of the rebalancing potentiometer 94 rebalances the bridge circuit.

For example, consider the result of a rise in pressure in the engine induction system. The bellows 80 is expanded by such pressure rise and the slider 77 is moved to the left along the resistance 74 reducing the magnitude of the positive voltage introduced by network 56 in the series circuit. This positive voltage is thus made insufficient to cancel out the negative voltages introduced by networks 54 and 58, whereupon the slider 94 becomes negative with respect to grounded conductor 59 causing the appearance at the amplifier input of a signal potential of a polarity such that terminal 51 is negative with respect to terminal 52. In terms of alternating voltage, this means that an alternating signal potential of a predetermined phase relation with respect to the supply voltage is supplied to the amplifier. Assuming that the amplifier 45 responds to a signal of this phase to provide motor field winding 36 with current of the proper phase, the motor will then move the waste gate 28 toward open position, reducing the pressure of the exhaust gases upon the turbine 25 and decreasing the speed thereof to reduce the compression ratio of the compressor 12 to the proper point to compensate for the aforesaid rise in induction system pressure. Movement of the waste gate 25 is accompanied by the movement of the slider 94 to the left along resistance 91 decreasing the voltage between slider 94 and conductor 55. In terms of the single half cycle, this means that the slider 94 is less negative than conductor 55 so that conductor 53 and input terminal 51 approach the same potential as the grounded conductor 59. This rebalancing movement of the slider 94 continues until the amplifier input terminal 51 assumes the same potential as input terminal 52 whereupon the motor 34 stops, leaving the waste gate 28 in a new position and with the series circuit again balanced.

In the same fashion a decrease in induction system pressure will reverse the movement of the slider 77 causing the appearance of a positive signal potential in the amplifier during the assumed half cycle. In terms of alternating current this means that there is applied to the amplifier an input voltage of opposite phase to that previously applied so as to cause the waste gate 28 to be moved toward closed position until the series circuit is again rebalanced by the coincident movement of the slider 94.

The same unbalancing, and then rebalancing, actions occur in the series circuit upon the movement of any of the other sliders 64, 70 and 86 and when the system functions properly, it will be apparent that any desired value of induction system pressure may be selected by the controller 66 and automatically maintained within close limits. The function of the controller 88 is, of course, to limit the rate of acceleration of the turbo-supercharger and when the acceleration reaches the predetermined safe rate, this slider is moved to the right along the resistance 83 to introduce a signal potential such as to cause opening movement of the waste gate to retard the speed of the turbine.

Considering now the operation of the network A, it is first assumed that the resistances 97 and 98 normally are of such values that, with the slider 105 properly positioned, this network will be balanced, that is, the conductor B will be at the same potential with respect to the terminal of the secondary winding 96 as is the conductor 55. As heretofore stated, however, the resistances 97 and 98 each have a high temperature coefficient of resistance so that when heat is applied they will rise in effective resistance in proportion to their operating temperatures.

The centrifugally operated switch 112 is so adjusted that when the turbine 25 and its shaft 29 reach a predetermined speed, the movable switch contact 115 will be thrown outward into contact with the fixed contact 114, thus completing a circuit from the transformer secondary winding 110 to the heating element 107. This circuit may be traced from the upper terminal of the winding 110 through the conductor 118, the brushes 116 and 117 across which the circuit is closed by the contacts 114 and 115, through the conductor 119 to the heater element 107, and through the conductor 111 back to the lower terminal of the secondary winding. When this circuit is thus closed, the heater element 107 immediately rises in temperature and, being enclosed along with the resistance 98 within the insulating enclosure 108, this rise in its temperature is immediately effective upon said resistance. As the resistance 98 is thus heated, it rapidly increases in resistance, having the effect of shifting the conductor B toward the left hand terminal of the secondary winding 96 or causing it to become more nearly the same potential as that terminal. Considering the operation, as heretofore stated, during a half cycle at which the polarity is as indicated by the legends in Figure 1, it will be apparent that this increase in resistance causes the conductor 55 to become relatively negative with respect to conductor B. There thus is introduced an unbalanced condition such that a negative signal potential is introduced into the series circuit causing the amplifying input terminal 51 to become negative with respect to terminal 52 and, as aforesaid, causing the amplifier to so energize the field winding 36 as to cause the motor 34 to move the waste gate 28 toward open position. This action has the immediate effect of reducing the speed of the turbine so that this thermally responsive network A thus acts as a true overspeed control.

The resistance 97 acts to provide ambient temperature compensation. Any change in the ambient temperature affects resistances 97 and 98 equally so as not to disturb the balance of the bridge.

When the turbine speed is thus reduced and maintained at less than a predetermined maximum value, the switch 112 of course will open so that the circuit to the heater element 107 is broken. However, the enclosure of this heater element along with the resistance 98 within the heat insulating body 108 retards the cooling of these parts so that the network A approaches a balanced condition slowly with respect to the speed at which it becomes unbalanced when an overspeed condition occurs in the turbine. Thus the waste gate opening signal is removed quite slowly and to such point that the call of the balance of the control system for a high turbine speed will not result in the waste gate being moved back to closed position. This would tend to cause rapid operation of the turbine with the result of the switch 112 being immediately reclosed, causing a rapid hunting in the control system.

While I have shown a switch operated by the centrifugal mechanism 112, it is to be understood that the centrifugal mechanism might operate a rheostat in series with heater 107 to provide for a variable degree of energization of the heater. This would result in a modulating effect of the overspeed controller instead of an on-and-off operation as provided by the switch.

The adjustable slider 105 permits the network A to be balanced under any initial conditions, as will be apparent.

FIGURE 2

In Figure 2, I have illustrated a preferred mechanical and electrical layout of the thermally responsive elements of the network A of Figure 1.

Here the resistances 97 and 98 are wound on identical tubular forms 126 and 127 which are mounted on conventional vacuum tube bases 128—129 and surrounded by vacuum tube envelopes 130—131. These resistances 97 and 98 are wound around resistance wires 132 and 133 respectively which are insulated electrically from the resistances 97 and 98 and which are adapted to heat the resistances 97 and 98. The terminals of the heater wire 132 are brought down as indicated at 134 and 135 to two pins 136 and 137 on the base 128, while the terminals of the resistance wire 97 are brought down as indicated at 138—139 to another pair of pins 140—141 on the base. The terminals of the heater wire 133 are brought down as indicated at 142—143 to pins 144—145 on the base 129 which pins correspond exactly to the pins 136—137 on the other base 128. In similar fashion, the ends of the resistance wire 98 are brought down as indicated at 146—147 to pins 148—149 corresponding exactly in position to the pins 140—141 on the other base 128.

The two identical units thus made are enclosed within an outer casing 150 having a sub-base 151 in which two conventional vacuum tube sockets 152 and 153 are arranged in spaced relation. The two vacuum tube-like units may thus be plugged into the sockets 152 and 153 interchangeably, but to the socket 152 only two conductors 154 and 155 will be connected, making connections to the pins 140 and 141 so that whichever unit is plugged into the socket will have its heater left "floating" or unconnected. The conductors 154 and 155 will, of course, make connection to the conductors 99 and 101 appearing in Figure 1. On the other hand, the socket 153 has conductors 156—157 making connection to the pins 144—145, and another pair of conductors 158—159 making connection to the pins 148—149. Thus, the unit plugged into the socket 153 will have connections made both to its resistance and to its heater. In the arrangement herein shown, the conductors 158—159 make connections at 100 and 101 in Figure 1, while the conductors 156 and 157 make connections to the heater circuit conductors 111 and 119.

It will be apparent from the foregoing that the two units thus formed, and with the socket connection described, are completely interchangeable, and should the heater element in one burn out then the other may be substituted to keep the network in operative condition. The resistances 97 and 98 are, of course, identical in characteristics since they are used in opposite legs of the bridge.

The envelope 131 of the unit in which the heater element is operative serves the same purpose as the heat insulating enclosure indicated at 108 in Figure 1, causing a temperature rise to rapidly effect the resistance 98, while the enclosure of both units in the casing or housing 150 subjects the unit acting as the resistance 97 to the ambient temperatures about the other heated unit for the purposes previously set forth. The casing 150 at the same time acts to dissipate and radiate the heat developed to such extent as to prevent the unit carrying resistance 97 from becoming heat saturated to a point at which the two resistances might assume the same value to cause undesired balancing of the bridge.

The interiors of the vacuum tube envelopes 130—131 are filled and sealed off with hydrogen, nitrogen or other inert gas which has the property of being a poor heat conductor and, when enclosed as it is here, of constant density. The use of a gas for this purpose will retard the conduction of heat from the heating element or wire 133 so that the bridge will rebalance slowly upon the disconnection of the heater from the energizing transformer. As stated heretofore, this slow cooling and rebalancing action is desirable to prevent hunting in the control system. The kind of gas used will affect the heating and cooling cycles of the bridge and may be selected in accordance with requirements. The selected thermal characteristics may be maintained regardless of altitudes if a gas of suitable properties is chosen.

FIGURE 3

The system illustrated here is identical to that shown in Figure 1 with the exception that the thermally responsive part of the series circuit is embodied in and as a part of the network 54. Otherwise the engine induction system, amplifier, control network and motor arrangement are all identical to the first disclosure and wherever such parts correspond they are given corresponding reference numerals in Figure 3.

In the network 54, moreover, the transformer secondary winding 90 has a tap 160 and the slidewire resistance 91 is connected at one end by a conductor 161 to this tap and at its other end by a conductor 162 to the right hand terminal of the winding, being thus placed across only a part of the winding in this case.

Another slidewire resistance 163 is provided and it is connected between the tap 160 and the left hand terminal of the secondary winding 90 by conductors 164 and 165. Cooperating with this resistance 163 is a slider 166, to which conductor B is connected, and together the resistance and slider form an overspeed controller designated generally at 167. This controller is thermally actuated as will now be described.

The slider 166 is carried and positioned by one end of a bimetal strip 168 anchored at its other end to a suitable support as indicated at 169. Around this strip 168 a heating element 170 is coiled and, together with the strip, is enclosed in a flexible insulating sheath 171. Said heating element is connected through the conductors 111 and 119 to the transformer secondary 110 under the control of the switch 112, thus replacing the heater element 107 of Figure 1. The entire controller 167 is enclosed with a heat dissipating housing or enclosure 172 and the resistance 163 is movably supported by the free ends of a pair of bimetal strips 173—174, the opposite ends of which are anchored at 175—176. The strips 173—174 are exposed to ambient temperatures within the enclosure 172 and about the heater 170.

*Operation of Figure 3*

Generally speaking, the operation of the system of Figure 3 is similar to that of Figure 1, but the potential introduced into the series circuit by the network 54 will now be determined by the relative positions of the two sliders 94 and 166. As here shown, and still assuming the polarity to be as indicated by the legends in the drawing, the slider 94 is negative with respect to the slider 166 by a magnitude determined by the value of the resistance 91 between the slider 94 and the conductor 162 and the value of resistance 163 between slider 166 and conductor 164. The system may obviously be so adjusted that, while the network 54 now introduces a negative signal voltage into the series circuit, it is balanced out by the sum of the voltage introduced by the balance of the network, so that no signal is present at the amplifier input.

Now if the speed of the turbine starts to exceed a safe maximum value, causing the switch contacts 114 and 115 to close, then the heater 170 will be energized and the uneven expansion of the bimetal strip 168 due to the resulting temperature rise will cause the strip to flex or bend, moving the slider 166 along the resistance 163. Properly arranged, this movement of the strip 168 will so adjust the slider 166 as to unbalance the network 54 and cause a signal potential to be developed across the amplifier input terminals 51 and 52 of a polarity such as to cause the energization of the motor field winding 36 and rotation of the motor 34 in proper direction to cause opening movement of the waste gate 28. For example, the movement of the slider 166 may be to the left in Figure 3 so that slider 94 becomes relatively more negative and a signal potential is developed such that the amplifier input terminal 51 is negative with respect to grounded input terminal 52. The opening movement of the waste gate 28 will of course counteract the overspeeding tendency of the turbine.

The heat insulation 171 about the bimetal strip 168 causes the same to heat very rapidly, upon energization of the heater 170; conversely, it retards cooling so that the waste gate will not be immediately reclosed by rapid cooling when the switch 112 opens in response to the decrease in speed called for by the initial heating. Thus the effect is to cause a thermal lag such as to remove the waste gate opening signal more slowly than it is introduced. This is of advantage in counteracting any hunting tendencies in the control.

The bimetallic strips 173 and 174 act to provide ambient temperature compensation. Upon any change in ambient temperature, the bimetallic elements 168, 173 and 174 are affected equally. While the effect of the temperature on bimetallic element 168 is to tend to cause movement of slider 166 with respect to resistance 163, the bimetallic elements 173 and 174 at the same time tend to move resistance 163 in the same direction. The result is that there is no relative movement between the slider 166 and resistance 163. When heater 170 is energized, however, only bimetallic element 168 is heated.

It is understood that suitable modifications may be made in the structure as disclosed, provided such modifications come within the spirit and scope of the appended claims. Having now therefore fully illustrated and described my invention, what I claim to be new and desire to protect by Letters Patent is:

I claim as my invention:

1. An electrical control system for a variable velocity device, comprising in combination, a voltage responsive control means for said device for varying the velocity of said device, means including an electrical impedance means connected to said control means for varying the voltage applied to said control means in accordance with the impedance of said impedance means, thermally operated means responsive to an increase in velocity of said device above a predetermined maximum to vary the impedance of said impedance means at a rapid rate and apply to said control means a voltage operative to cause said control means to reduce the velocity, said thermally operated means being thermally lagged to retard the rate at which the impedance value of said impedance means is returned to its normal value as said velocity diminishes.

2. Electrical apparatus for controlling a variable condition, comprising in combination, control means for varying said condition to maintain a desired value of said condition, a normally balanced compound electrical network connected to said control means and operative when unbalanced for any cause to actuate said control means for varying the condition, said network including a normally balanced thermally responsive portion, and means responsive to a predetermined variation in said condition for thermally actuating said network portion to unbalance the network and correct the condition, and said network portion being thermally lagged in only one direction to retard the rate at which the network is restored to balance when said predetermined variation in the condition is corrected.

3. Electrical apparatus for controlling a variable condition, comprising in combination, control means for varying said condition, a normally balanced compound electrical network connected to said control means and operative when unbalanced for any cause to actuate said control means for varying the condition to maintain said condition at a desired value, said network including a normally balanced bridge embodying at least one resistance element having a high temperature coefficient of resistance, heating means operative in response to a predetermined change in the condition for heating said resistance element to cause the same to vary in effective resistance and thereby unbalance the network and initiate the correction of the condition, and means for retarding only the rate of cooling of said element when the condition is corrected so that the unbalanced condition in the network will disappear more slowly than it was introduced in response to said change in the condition.

4. Electrical apparatus for limiting the velocity of a variable velocity device, comprising in combination, an electronic amplifier responsive to a signal potential for varying the velocity of said device, a normally balanced electrical network operative when unbalanced to produce a signal potential for actuating said amplifier, and thermally operated means in said network responsive to an increase in the velocity of said device above a predetermined maximum for rapidly introducing an unbalancing effect into the network and producing a signal potential calling for a reduction in said velocity and then gradually removing the unbalancing effect as the velocity diminishes below said maximum.

5. Electrical apparatus for limiting the velocity of a variable velocity device, comprising in combination, an electronic amplifier responsive to a signal potential for varying the velocity of said device, a normally balanced electrical network operative when unbalanced to produce a signal potential for actuating said amplifier, and thermally operated means embodied in the network responsive to an increase in the velocity of said device above a predetermined maximum for introducing an unbalancing effect into the network and producing a signal potential calling for a reduction of said velocity, said means being thermally lagged to cause said unbalancing effect to disappear slowly as the velocity of the device is reduced.

6. Electrical apparatus for limiting the velocity of a variable velocity device, comprising in combination, an electronic amplifier responsive to a signal potential for varying the velocity of said device, a normally balanced electrical network operative when unbalanced to produce a signal potential for actuating said amplifier, thermally operated means embodied in the network responsive to an increase in the velocity of said device above a predetermined maximum for temporarily unbalancing the network and calling for a reduction in velocity of said device, and another thermally responsive means subject to ambient temperatures about the first mentioned means and operative to compensate for changes in ambient temperature.

7. Electrical apparatus for controlling a motor-driven supercharger, comprising in combination, means for adjusting the velocity of the motor driving said supercharger, means responsive to a signal potential for controlling said adjusting means, a normally balanced electrical impedance network operative when unbalanced to produce a signal potential effective on the said last named means, means responsive to a pressure condition affected by said supercharger for varying the balance of the network, and means including said network responsive to the velocity of said motor and operable to unbalance the network when a predetermined safe velocity has been exceeded to produce a signal potential calling for a reduction in said velocity and then to rebalance the network as the velocity diminishes, said last named means having a thermally responsive element, a heating element associated therewith, and means responsive to the velocity of said motor for controlling the energization of said heating element.

8. Electrical apparatus for controlling a motor driven supercharger, comprising in combination, means for adjusting the velocity of the motor driving said supercharger, an electronic amplifier responsive to a signal potential for controlling said adjusting means, a normally balanced compound electrical network operative when unbalanced to produce a signal potential effective on the amplifier, means responsive to a pressure condition affected by said supercharger for varying the balance of the network, and means including a bridge making up a part of said network responsive to an increase in the velocity of the motor to a predetermined safe maximum to quickly unbalance the network and produce a signal potential calling for a reduction in said velocity and then to gradually rebalance the network as the velocity diminishes, said bridge including a plurality of legs and two thermally responsive resistance elements in different legs thereof, a heating element directly associated with one resistance element, and means for said heater under control of the motor velocity to unbalance the network, the other of said resistance elements being exposed to ambient temperatures about the first and operative to compensate for changes in ambient temperature.

9. Electrical apparatus for controlling a motor driven supercharger, comprising in combination, means for adjusting the velocity of the motor driving said supercharger, an electronic amplifier responsive to a signal potential for controlling said adjusting means, a normally balanced electrical network operative when unbalanced to produce a signal potential effective on the amplifier, means responsive to a pressure condition affected by said supercharger for varying the balance of the network in response to variations in said pressure condition, and further means in said network responsive to an increase in the velocity of the motor to a predetermined safe maximum to quickly introduce an unbalancing effect into the network and produce a signal potential calling for a reduction in said velocity and then to gradually rebalance the network as the velocity diminishes, said further means including at least one thermally responsive resistance, a heater associated therewith, and means responsive to an increase in velocity of the motor to energize said heater to unbalance the bridge, said resistance and heater being heat insulated to retard cooling as the velocity diminishes.

10. Electrical apparatus for controlling a motor, comprising in combination, means for adjusting the velocity of the motor, an electronic amplifier responsive to a signal potential for controlling said adjusting means, a normally balanced electrical impedance network operative when unbalanced to produce a signal potential effective on the amplifier, and means in said network responsive to an increase in the velocity of the motor beyond a predetermined safe maximum to quickly unbalance the network and produce a signal potential calling for a reduction in said velocity and then to gradually rebalance the network as the velocity diminishes, said last named means including at least one thermally responsive resistance, a heater connected in said network, and means responsive to an increase in velocity of said motor to energize said heater, said resistance and heater when a predetermined safe maximum velocity has been reached, being enclosed within an enclosure containing an inert gas, the characteristics of which regulate the rate of cooling of the resistance when the velocity of the motor diminishes below the said safe maximum.

11. Electrical apparatus for controlling a variable velocity device, comprising in combination, means for adjusting the velocity of said device, a normally balanced electrical network connected to said control means and operative when unbalanced to actuate said control means to vary the velocity of said device, said network including two thermally responsive resistances exposed to the same ambient temperature and connected in opposing portions of said network, a heater associated with one of said resistances, and means responsive to the velocity of said variable velocity device for energizing said heater to unbalance said network, said two thermally responsive resistances being enclosed within enclosure means having plug-in base means, and said apparatus including socket means in which said base means is detachably secured.

12. Electrical apparatus for controlling a variable velocity device, comprising in combination, means for adjusting the velocity of said device, a normally balanced electrical network connected to said control means and operative when unbalanced to actuate said control means to vary the velocity of said device, said network including two thermally responsive resistors, said two thermally responsive resistances being each enclosed within a separate enclosure having a plug-in base, said apparatus including a pair of sockets in which said bases are interchangeably mounted, said bases and sockets having connections associated therewith for connecting said resistors into said network in such a manner that equal changes in the resistance of said resistors do not affect the balance of said network, a heating element associated with each of said resistors, and means responsive to the velocity of said device for establishing a connection from a source of energy upon the velocity exceeding a predetermined value, the connections associated with one only of said sockets providing for connection of said last named means to the heater of the resistance unit whose plug-in base is plugged into that socket.

13. Electrical apparatus for controlling a variable condition, comprising in combination, control means for varying said condition, a normally balanced compound electrical network connected to said control means and operative when unbalanced for any cause to actuate said control means for varying the condition, said network including a potentiometer type resistance and slider, thermally operated means responsive to a predetermined variation in said condition for adjusting said slider along the resistance in one direction and for thereby unbalancing the network to correct the condition, and thermally operative means operative to displace the resistance relative to the slider under the influence of ambient temperatures developed by the first mentioned thermally operated means and in a direction such as to initiate a rebalancing effect in the network.

GEORGE L. BORELL.

REFERENCES CITED

The following references are of record in the file of this patent:

UNITED STATES PATENTS

| Number | Name | Date |
|---|---|---|
| 1,210,049 | Copley | Dec. 26, 1916 |
| 1,767,052 | Crouse et al. | June 24, 1930 |
| 1,895,498 | Stoller | Jan. 31, 1933 |
| 2,205,306 | Olshevsky | June 18, 1940 |
| 2,264,487 | Smulski | Dec. 2, 1941 |
| 2,376,142 | Hoffmann et al. | May 15, 1945 |